July 30, 1963 R. G. TURNER 3,099,125

MOWER BLADE RETAINER

Filed June 8, 1961

INVENTOR.
ROBERT G. TURNER
BY
Wolfe, Hubbard, Voit & Osann
ATTORNEYS.

3,099,125
Patented July 30, 1963

3,099,125
MOWER BLADE RETAINER
Robert G. Turner, Detroit, Mich., assignor to Massey-Ferguson Inc., Detroit, Mich., a corporation of Maryland
Filed June 8, 1961, Ser. No. 115,666
2 Claims. (Cl. 56—305)

The present invention relates to agricultural mowers and concerns, more particularly, a retainer for the blade of a mower.

An agricultural mower of the type with which the invention is concerned includes a saw toothed bar on which a saw tooth knife blade is slidably mounted. In operation, the bar is carried on a vehicle for movement through the crop to be cut and the blade is reciprocated to produce the cutting action. The knife blade is conventionally held in place by a plurality of hold-down members rigidly mounted on the bar so as to overlie and press the blade against the bar.

In a conventional mower construction of this type, the blade is removed by sliding it longitudinally from beneath the hold-down members. Since modern mower assemblies approach eighteen to twenty-foot cutting widths, this method of blade removal becomes quite difficult, both because of simple space limitations as well as the tendency of such long flexible members to bind. It is also difficult with such constructions to establish and maintain the proper hold-down pressure on the blade for good cutting action without excessive friction.

Accordingly, it is the primary aim of the invention to provide a novel, easily opened retainer for a mower blade which allows the blade to be lifted without difficulty from the mower assembly.

It is also an object of the invention to provide a retainer as referred to above which effectively holds the knife blade in an operating position and which permits the hold-down pressure to be adjusted. A collateral object is to provide a retainer of the above character which does not interfere with the normal cutting action of the mower.

A further important object is to provide a retainer having the above features and advantages which is economical to manufacture so as to not appreciably add to the cost of an agricultural mower utilizing such retainers.

Other objects and advantages of the invention will become apparent upon reading the following detailed description and upon reference to the drawings, in which.

Figure 1:
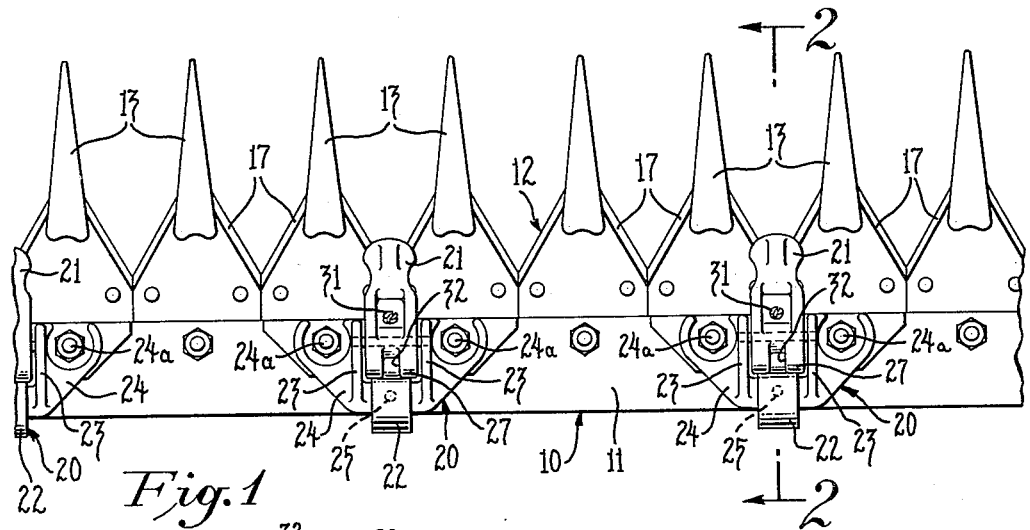
FIGURE 1 is a fragmentary plan of a mower bar assembly constructed in accordance with the invention.

While the invention will be described in connection with a preferred embodiment, it will be understood that I do not intend to limit the invention to that embodiment. On the contrary, I intend to cover all alternatives, modifications and equivalents as may be included within the spirit and scope of the invention as defined by the appended claims.

Turning now to the drawings, there is shown a fragment of a mower bar assembly 10 embodying the invention and including an elongated bar 11 on which a knife blade 12 is slidably mounted. The bar 11 carries a plurality of rock guards 13 which support ledge or wear plates 14 that define the stationary cutting edges of the mower assembly.

The knife blade 12 includes an elongated body member 16 on which are rigidly mounted a plurality of generally triangular blade elements 17. The blade elements 17 are slidably supported on the wear plates 14 so that, in operation, reciprocation of the elongated member 16 causes relative movement between the plates 14 and the elements 17 so that their saw-toothed cutting edges produces a cutting action, as will be apparent to those skilled in the art.

In accordance with the invention, the blade 12 is held in place by a plurality of retainers 20 which include hold-down fingers 21 swingable from a position in contact with the blade elements 17 to a raised position providing clearance for lifting the knife blade 12 free of the bar 11. A spring member 22 for each of the fingers 21 releasably holds the fingers into contact with the blade elements 17 with an overcentering snap action.

In the preferred embodiment, the fingers 21 are pivoted between upstanding portions 23 formed integrally with brackets 24. The brackets 24 are rigidly secured to the bar 11 on the rear or non-cutting side of the knife blade 12 by bolts 24a.

Figure 2:
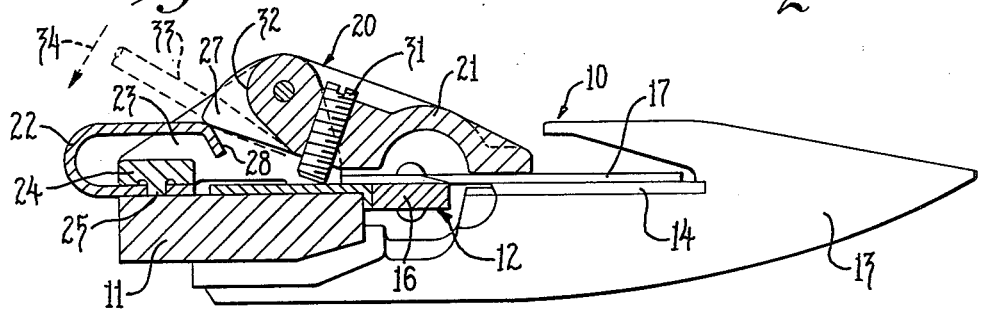
FIG. 2 is an enlarged section taken approximately along the line 2—2 in FIG. 1.
Figure 3:
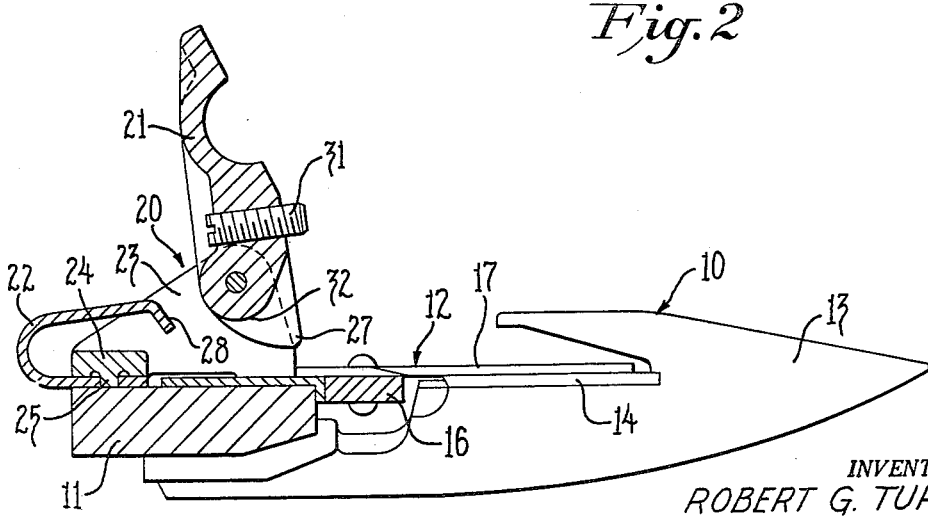
FIG. 3 is similar to FIG. 2 and shows the parts in an alternate position.

The spring members 22 are generally U-shaped and are anchored in position by being sandwiched between the brackets 24 and the mower bar 11 (see FIGS. 2 and 3). An integral pin 25 on each of the brackets 24 is seated within an aperture in the respective spring members 22 so as to prevent their displacement.

Each of the fingers 21 includes a projection 27 which engages the slightly turned free end 28 of the adjacent spring member 22 so that the projections 27 snap over the spring ends 28 with an overcentering action as the fingers 21 approach the blade 12. This causes the spring members 22 to urge the fingers 21 firmly against the blade elements 17, thereby maintaining the blade elements 17 in proper cutting relationship with respect to the wear plates 14.

For controlling the pressure of the fingers 21 on the knife blade 12, the fingers carry adjustable abutments in the form of set screws 31 which are threaded in the respective fingers. The set screws 31 are adapted to bear on the mower bar 11 as the fingers engage the blade elements 17 and thus, by threadably adjusting the set screws 31, the pressure of the fingers against the blade elements can be adjusted.

To facilitate raising the fingers 21 free of their respective spring members 22, the fingers are formed with relieved portions 32 facing the ends 28 of the respective members so that an elongated tool can be inserted within the portions 32 to pry the spring members 22 downwardly and the fingers 21 upwardly. The tip of a screwdriver 33 serves as a convenient tool, and, as shown in FIG. 2 in dashed lines, the screwdriver 33 may be inserted in the portion 32 and swung downwardly in the direction of the arrow 34 to apply downward pressure on the spring member and a lifting force on the finger 21. In this way, the finger projection 27 is easily snapped over the end 28 of the spring member so that the finger clears the spring member and can be lifted to its raised FIG. 3 position.

With the fingers 21 in their raised FIG. 3 position, there is adequate clearance for lifting the mower blade 12 upwardly and rearwardly from the wear plates 14 and the rock guards 13 so that the knife blade can be easily removed from the mower assembly 10. Of course, replacement of the knife blade is equally simple. With the blade elements 17 again seated on the wear plates 14, the fingers 21 are simply swung downwardly until the projections 27 snap over the ends 28 of the respective spring members 22.

It can now be seen that the retainers 20 provide an effective but easily releasable hold-down arrangement for maintaining the mower knife blade in proper cutting position within the mower assembly 10. The retainers 20 are well clear of the forward cutting portions of the mower assembly and hence do not interfere with normal cutting action.

Those skilled in the art will also appreciate that the retainers 20, because of their straight forward, relatively simple design, can be quite economically manufactured and hence their inclusion in a mower assembly adds little to the total cost of the unit while providing the many advantages referred to above.

I claim as my invention:

1. In an agricultural mower having an elongated bar with wear plates on which an elongated knife blade is slidably carried, a retainer for holding said blade on said plates, comprising, in combination, a bracket rigidly secured to said bar on the non-cutting side of said blade, a hold-down finger pivoted on said bracket so as to be swingable into contact with said blade, a spring member anchored relative to said bar, said finger having a projection which snaps over said spring member as the finger approaches said blade so that the member urges said finger against the blade, said finger being formed with a relieved portion facing said spring member so that an elongated tool can be inserted within said portion to pry said spring member down and said finger up and thus snap said projection over the spring member.

2. In an agricultural mower having an elongated bar with wear plates on which an elongated knife blade is slidably carried, a retainer for holding said blade on said plates, comprising in combination, a bracket rigidly secured to said bar on the non-cutting side of said blade, said bracket having a spaced pair of upstanding portions, a hold-down finger pivoted between said portions so as to be swingable into contact with said blade, a spring member anchored between said bracket and said bar and extending between said portions, said finger having a projection which snaps over said spring member as the finger approaches said blade so that the member urges said finger against the blade, and a threaded member fitted in said finger to bear on said bar and provide an adjustable abutment for controlling the pressure of said finger on said blade, said finger being formed with a relieved portion facing said spring member so that an elongated tool can be inserted within said portion to pry said spring member down and said finger up and thus snap said projection over the spring member.

References Cited in the file of this patent

UNITED STATES PATENTS 1,428,657    Purdy _____ Sept. 12, 1922

FOREIGN PATENTS 698,875    Germany _____ Nov. 19, 1940